D. L. LINDQUIST.
ALTERNATING CURRENT ELECTROMAGNET.
APPLICATION FILED FEB. 6, 1913.

1,066,293.

Patented July 1, 1913.

Witnesses:
J. W. Millward
May T. McFarry

Inventor
David L. Lindquist
By his Attorney
Carl Benjamin

UNITED STATES PATENT OFFICE.

DAVID L. LINDQUIST, OF YONKERS, NEW YORK.

ALTERNATING-CURRENT ELECTROMAGNET.

1,066,293.

Specification of Letters Patent.

Patented July 1, 1913.

Application filed February 6, 1913. Serial No. 746,447.

*To all whom it may concern:*

Be it known that I, DAVID L. LINDQUIST, a subject of the King of Sweden, residing at Yonkers, in the county of Westchester and State of New York, have invented a certain new and useful Improvement in Alternating - Current Electromagnets, of which the following is a specification.

The invention relates to an alternating current electro-magnet, of the general type disclosed in U. S. Letters Patent No. 744,773, granted to me November 24, 1903, and more particularly to the specific type disclosed in U. S. Letters Patent Nos. 1,005,855 and 1,005,856, granted to me October 17, 1911, wherein the core carries a secondary conductor or secondary conductors, in which is induced a current of different phase from that energizing the primary. As set forth in the aforesaid Letters Patent, such an alternating current magnet will hold its moving member firmly in attracted position without vibration or chattering.

My present invention consists in the construction of the core and secondary conductor therein, the means for absorbing heat from said secondary conductor, and the arrangement of a variable resistance in the secondary circuit.

Figure 1:
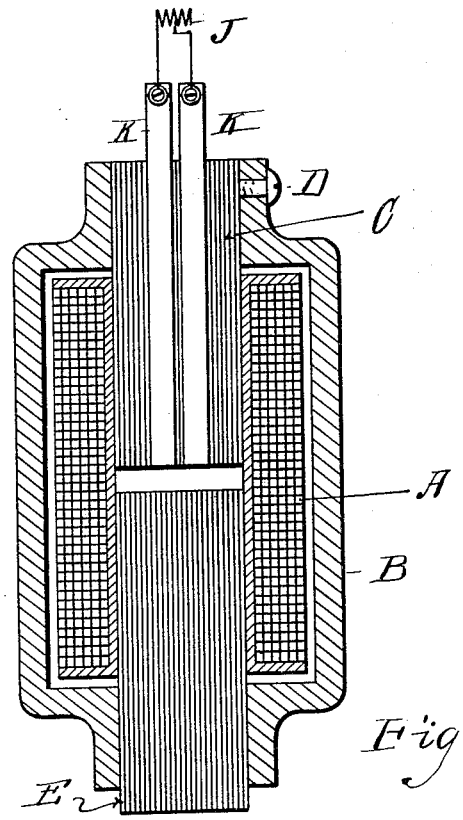
Figure 2:
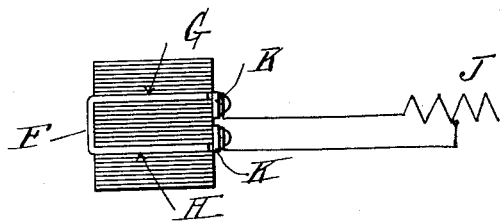
Figures 3, 4:
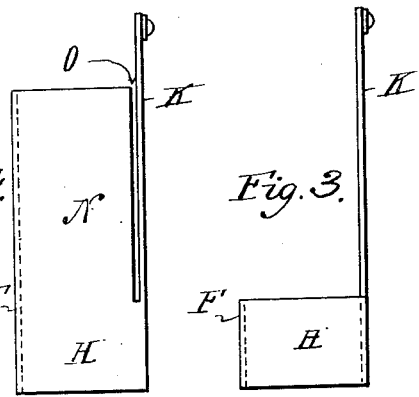
Figures 5, 6:
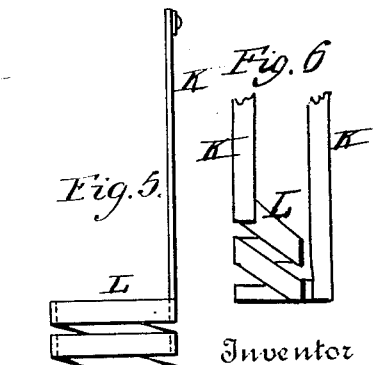

In the accompanying drawings—Figure 1 is a longitudinal section of my electro-magnet. Fig. 2 is a plan view of the upper end of the fixed member of the core. Fig. 3 is a side elevation of the secondary conductor. Fig. 4 is a similar view, showing the integral extension of the metal of said conductor for absorbing heat therefrom. Fig. 5 is a side, and Fig. 6 is a partial front elevation of the secondary conductor, having one of its arms in the form of a helix.

Similar letters of reference indicate like parts.

A is the primary coil which is to be supplied with single-phase current.

B is the casing.

C is the fixed portion of the core, secured in the casing by clamping screw D.

E is the armature formed of parallel laminations, and drawn into the coil when the same is energized.

To the core is secured a doubled-over plate F of copper or other material of high conductivity. The arms G, H of said plate are here shown as disposed between the laminations, in which case the same number of laminations should lie outside of each arm. The extremities of the arms are bent over inwardly and connected to bars K, which bars extend along one side of the core. To said bars are connected the terminals of a variable resistance J, which is thus brought into the secondary circuit.

When it is desired to reduce the heating of the secondary, I provide a metallic mass for that purpose, preferably by extending the arms G, H, as shown at N in Fig. 4, leaving gaps O between said extensions and bars K. This additional and relatively large mass of metal absorbs heat from the secondary. When disposed within the core, it is protected and combined with said core in compact shape. Where a high resistance is desired in the secondary, I may make the plate F narrow, and provide a helix L in one arm thereof, which incloses a portion of the laminations included between the plate arms, as shown in Figs. 5 and 6, the bars K being connected to said plate, as before. The object of the variable resistance, externally disposed, is to provide for convenient phase adjustment of the current.

I here show the plate F applied to the fixed portion C of the core. It will be obvious that it may be applied in like manner to the movable portion or armature E.

I claim:

1. An alternating current electro-magnet of the type set forth, comprising a primary coil, a laminated core, a secondary conductor carried by said core and extending between laminations thereof, and means within said core for absorbing heat from said conductor.

2. An alternating current electro-magnet of the type set forth, comprising a primary coil, a laminated core, a plate of material of high conductivity having arms disposed between the laminations of said core, means for closing the secondary circuit through a portion of said plate, and means on said plate for absorbing heat from said portion included in said secondary circuit.

3. An alternating current electro-magnet of the type set forth, comprising a primary coil, a laminated core, a plate of material of high conductivity having arms disposed between the laminations of said core, means for closing the secondary circuit through a portion of said plate, and an integral extension of the mass of said plate for absorbing heat from said portion included in said secondary circuit.

4. An alternating current electro-magnet of the type set forth, comprising a primary coil, a laminated core, a plate of material of high conductivity having arms disposed between the laminations of said core, and conducting bars carried by said core and connected respectively to said arms.

In testimony whereof I have affixed my signature in presence of two witnesses.

DAVID L. LINDQUIST.

Witnesses:
GERTRUDE T. PORTER,
MAY T. McGARRY.